(12) United States Patent
Takahashi

(10) Patent No.: US 6,442,122 B1
(45) Date of Patent: Aug. 27, 2002

(54) DISC LOADING APPARATUS

(75) Inventor: Yorio Takahashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/405,177

(22) Filed: Sep. 24, 1999

(30) Foreign Application Priority Data

May 19, 1998 (JP) .......................................... 10-153827

(51) Int. Cl.[7] .............................................. G11B 17/04
(52) U.S. Cl. ..................................................... 369/77.1
(58) Field of Search .......................... 360/99.02, 99.06, 360/137; 369/75.1, 75.2, 77.1, 292; 361/685; 267/155

(56) References Cited

U.S. PATENT DOCUMENTS

| | | | | |
|---|---|---|---|---|
| 3,800,328 A | * | 3/1974 | Harlan et al. ................ 360/137 |
| 4,675,858 A | * | 6/1987 | d'Alayer de Costemore d'Are .. 369/77.1 |
| 5,355,358 A | * | 10/1994 | Van Alfen .................. 369/77.1 |
| 5,481,520 A | * | 1/1996 | Tokoro ....................... 369/77.2 |
| 5,537,378 A | * | 7/1996 | Uehara et al. ............. 369/77.2 |
| 5,648,882 A | * | 7/1997 | Tangi et al. ............. 360/99.06 |
| 5,737,293 A | * | 4/1998 | Kawamura et al. ......... 369/77.1 |
| 5,831,965 A | * | 11/1998 | Fujiwara et al. ............. 369/178 |
| 5,859,828 A | * | 1/1999 | Ishibashi .................... 369/77.1 |
| 5,940,245 A | * | 8/1999 | Sasaki et al. ............. 360/99.06 |
| 6,038,202 A | * | 3/2000 | Kanatani et al. ........... 369/77.2 |
| 6,049,452 A | * | 4/2000 | You et al. .................... 361/685 |
| 6,055,124 A | * | 4/2000 | Habara et al. ........... 360/99.02 |
| 6,056,280 A | * | 5/2000 | Dials et al. .................. 267/155 |
| 6,137,771 A | * | 10/2000 | McGrath et al. ............ 369/291 |
| 6,219,325 B1 | * | 4/2001 | Sato .......................... 369/77.1 |
| 6,243,231 B1 | * | 6/2001 | Morris et al. ................ 360/133 |

FOREIGN PATENT DOCUMENTS

| | | |
|---|---|---|
| JP | 3-33977 | 7/1991 |
| JP | 3045083 | 10/1997 |

* cited by examiner

*Primary Examiner*—Brian E. Miller
*Assistant Examiner*—Tianjie Chen
(74) *Attorney, Agent, or Firm*—Wenderoth, Lind & Ponack, L.L.P.

(57) ABSTRACT

A disc loading apparatus is provided at a lower longitudinally extending edge of an opening lid of generally rectangular shape with a continuously curved edge that extends from both ends toward a center of the lower longitudinally extending edge in a direction toward the upper longitudinally extending edge of the lid. The apparatus is also provided at a surface of the opening lid that contacts the disc, with a continuously curved surface that extends from both ends toward the center of the opening lid in a direction toward an inside of the disc loading apparatus.

25 Claims, 3 Drawing Sheets

DISC LOADING APPARATUS

FIELD OF THE INVENTION

The present invention relates to a disc loading apparatus for a disc player.

BACKGROUND OF THE INVENTION

There are a wide variety of apparatuses for loading discs such as CD, CD-ROM, CD-R, CD-RW, Laser disc, DVD, DVD-ROM, Video disc, Analog record and the like, into disc players. One example of a disc loading apparatus has a disc insertion opening with a continuous slope in order to prevent a disc from being scratched due to contact with the opening (disclosed in Japanese Utility Patent Examined Publication, No. H03-33977). Among disc loading apparatuses having a lid for the disc insertion opening for preventing dust from entering into a disc player, one type has an opening which is closed by a lid made of shielding material formed of soft felt, so that a disc is inserted into the disc player by passing between an upper part and a lower part of the lid made of the soft shielding material, while being in contact with the lid. Also, there is a type in which a disc is inserted into the disc player by pushing the lid open with a non-recorded surface of the disc.

However, the disc loading apparatus for which a disc is inserted into the disc player by passing between two divided parts of the soft shielding lid, while keeping the disc in contact with the lid, causes fine scratches on a recorded surface of the disc even with the soft shielding material. With the disc loading apparatus for which a disc is inserted by pushing the lid open with a non-recorded surface of the disc, there is also a likelihood of scratching a recorded surface, if the disc is inadvertently inserted upside down, or if data is recorded on both sides.

SUMMARY OF THE INVENTION

A disc loading apparatus of the present invention includes a frame member having a disc insertion opening formed therein, and an elongated opening lid movably mounted to the frame member for movement between a closed position covering the disc insertion opening and an open position allowing the disc to be inserted through the disc insertion opening along a disc insertion path. The opening lid has two longitudinal ends, first and second longitudinally extending edges (sides) and first and second opposite faces. One of the first and second faces faces the disc insertion opening when the lid is in the closed position, and the other face faces away from the opening when the lid is in the closed position. The first longitudinally extending edge of the lid is sloped from each longitudinal end toward a center of the lid in a direction toward the second longitudinally extending edge of the lid. The foregoing structure can realize a disc loading apparatus for a disc player, in which a disc can be inserted by pushing against the opening lid to cause it to open without causing scratches on either surface of the disc.

In a preferred form of the invention, the sloped edge of the lid is a continuously curved edge that extends from both ends toward a center thereof in a direction toward the other longitudinal extending edge of the lid. The foregoing structure, wherein the continuously curved edge is provided makes only a point-contact or a linear contact between the curved edge of the opening lid and an edge of the disc when the disc is inserted by pushing the opening lid to open. Accordingly, the foregoing structure can provide an effect of preventing the disc from being in surface-contact with the opening lid, and avoiding scratches on the surface of the disc.

Further, the opening lid is provided with a sloped (e.g. continuously curved) surface that extends from both ends toward a center of the opening lid in a direction toward the other surface of the lid, in other words toward an inside of the disc loading apparatus. The foregoing structure can provide an effect of preventing the disc from being in surface-contact with the opening lid, and avoiding scratches on the surface of the disc, since the opening lid and the disc make only point-contact or linear contact when the disc is inserted by pushing the opening lid to the open position.

DESCRIPTION OF THE PREFERRED EMBODIMENT

An exemplary embodiment of the present invention will be described hereinafter by referring to the accompanying figures.

Figure 1:
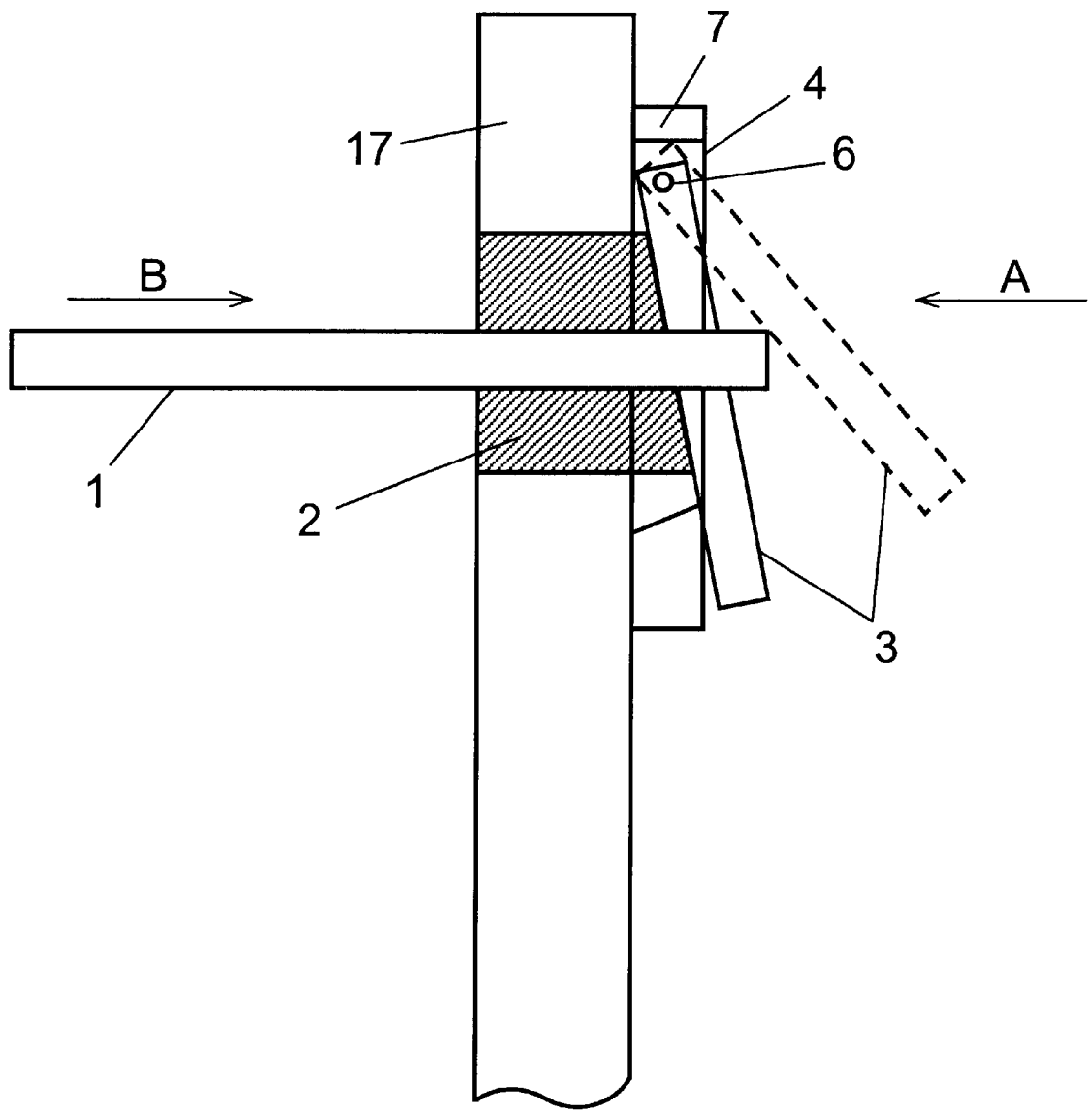
FIG. 1 is a side view depicting a structure of a disc insertion arrangement in a disc loading apparatus of an exemplary embodiment of the present invention.
Figure 2A:
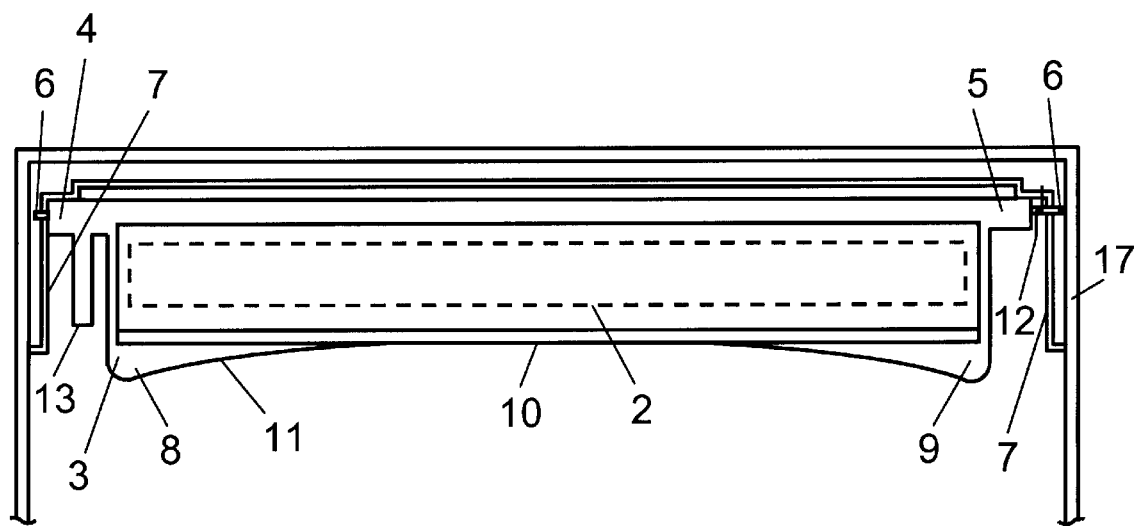
FIG. 2A shows the structure of the disc insertion arrangement as viewed along direction A in FIG. 1 from inside of the disc loading apparatus.
Figure 3:
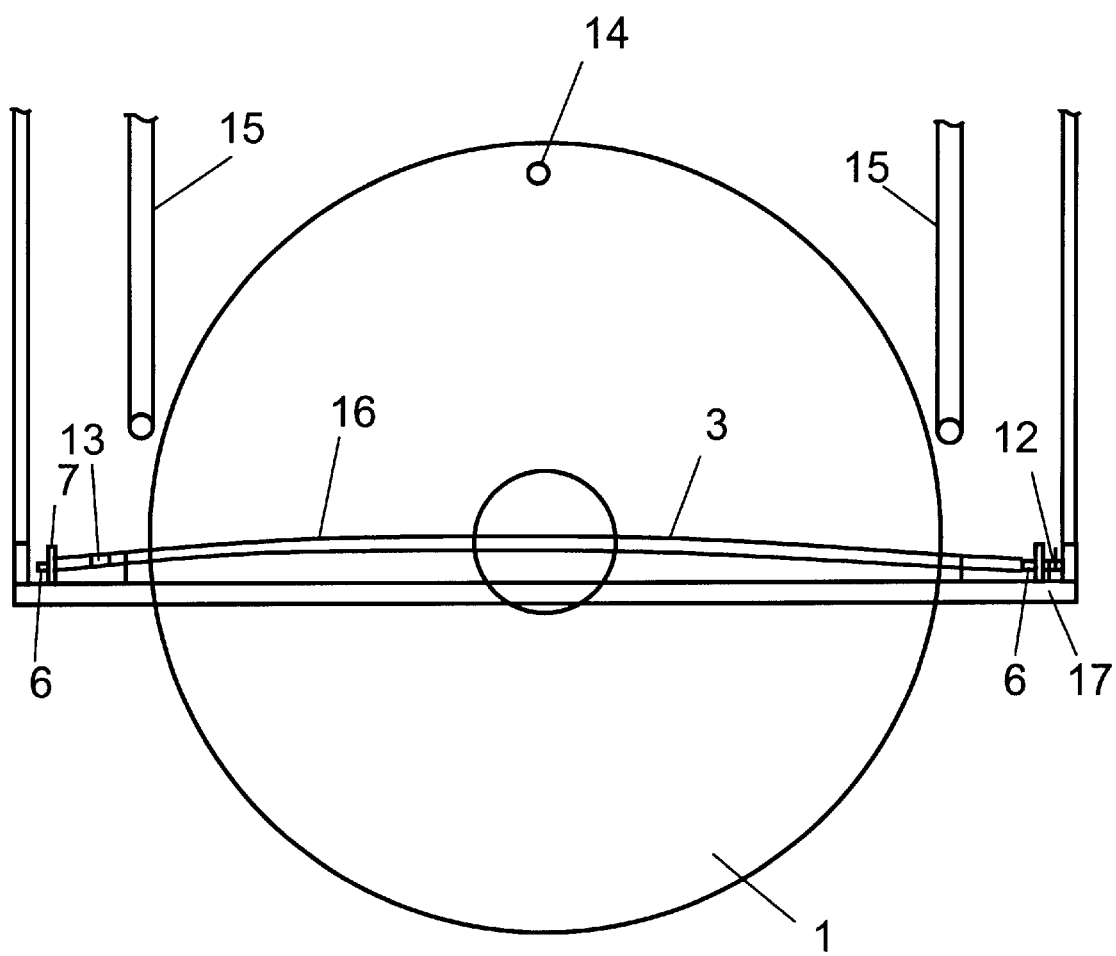
FIG. 3 is a plan view depicting the structure of the disc insertion opening arrangement in the same disc loading apparatus.

FIG. 1 is a side view, FIG. 2A is an inside view and FIG. 3 is a plan view, all depicting a structure of a disc insertion arrangement in a disc loading apparatus of the exemplary embodiment of the present invention. A disc player is provided with a disc insertion opening 2 of a generally rectangular shape formed in a frame member 17 such as the front portion of the disc player housing, wherein a width of the opening 2 is slightly greater than a diameter of a disc, such that a disc 1 can be inserted directly through the opening 2. A generally rectangular opening lid 3 is mounted openably over the disc insertion opening 2 in order to close the disc insertion opening 2 and to prevent dust etc. from entering into it. The opening lid 3 is mounted at its upper side (i.e. adjacent its upper longitudinally extending edge) to a case 7 by retainers 6 provided at both ends 4 and 5 of the upper edge. The retainers 6 define an axis about which the lid 3 is freely swingable. Thus, the opening lid 3 can be pushed by the disc 1 during insertion of the disc 1, so as to swing the lid 3 open about the axis defined by the lid retainers 6, as shown in FIG. 1. The disc 1 is inserted into the disc player with the edge of the disc 1 being in contact with the opening lid 3. A lower longitudinally extending edge (side) of the opening lid 3 forms a continuous slope (i.e. a curved edge) 11 that extends from both ends 8 and 9 toward a center portion 10 of the lower edge in a direction so that the center portion 10 is spaced further from a surface of the disc 1 than are the ends 8 and 9 of the lower edge, as shown in FIG. 2A.

In this exemplary embodiment, a plane along which the disc 1 passes during insertion of the disc 1, as depicted in FIG. 1 by arrow B, is referred to as a passage plane. The curved edge (side) 11 provided at the lower edge of the opening lid 3 is continuosly curved upwardly from both ends 8 and 9 toward the center 10 of the edge.

The opening lid 3 is biased in a direction of closing the disc insertion opening 2 at all times by a spring 12 wound around an axis of one of the lid retainers 6. A lever 13 is provided at one end of the opening lid 3 for use in unloading the disc 1. A sensor 14 is provided within the disc loading apparatus for detecting the disc 1 as it is being inserted into the disc player. Belts 15 drive an automatic loading mechanism that carries the disc 1 into the disc player, stops the disc 1 at a predetermined position, and places it on a disc rotating mechanism in position for replay.

The opening lid 3 is so constructed that it is slightly longer than an intervening space between the two lid retainers 6, so that the opening lid 3 curves toward the sensor 14 when the opening lid 3 is mounted to the case 7, as illustrated in FIG. 3. As a result, the opening lid 3 forms a continuously sloped surface (i.e. a curved surface) 16 that extends from the both ends 4 and 5 of the upper edge and both ends 8 and 9 of the lower edge toward the center in a direction toward the sensor 14 when the lid 3 is in its closed position. In other words, the opening lid 3 curves toward an inside of the disc loading apparatus when closed.

Accordingly, the opening lid 3 is characterized by having the continuously curved surface 16 extending from both ends toward the center of the opening lid 3 in a direction such that the center portion of the opening lid 3 is spaced further away from a surface of the disc than the end portions of the opening lid 3 that is in contact with the disc 1, when the opening lid 3 is being pushed and opened by the disc 1.

Thus, as has been described, the opening lid 3 of the present exemplary embodiment is shaped with the curved edge 11 and the curved surface 16 such that, when the disc 1 is being inserted into the opening 2 by contacting and pushing the opening lid 3 toward an open state, the center portion of the lid is spaced away from the contacting surface of the disc 1.

In the disc loading apparatus of the foregoing structure, the opening lid 3 is pushed and opened by the disc 1 with the lid retainers 6 of the opening lid 3 acting as a fulcrum when the disc 1 is inserted. The disc 1 is inserted into the disc player while remaining in contact with the opening lid 3, until such time as the automatic loading mechanism starts operating when the insertion is detected by the disc insertion sensor 14. One example of the sensor 14 is a photo-detector for optically detecting the disc 1 that passes through the opening 3 into the player. When the sensor 14 detects the disc 1, the belts 15 of the automatic loading mechanism carry the disc 1 into the disk player, stop the disc 1 at a predetermined position, and place the disc 1 on the disc rotating mechanism in position for replay.

During insertion of the disc 1 through the disc insertion opening 2, the disc 1 is loaded while the opening lid 3, which is pushed and opened by the disc 1, maintains contact with an edge of the disc 1 due to tension of the spring 12 mounted on the lid retainer 6. As described above, the opening lid 3, which is pushed and opened by the disc 1, is provided with the continuously curved edge 11 and the continuously curved surface 16. Therefore, the opening lid 3 makes only point-contact or linear contact with a peripheral edge of the disc 1 when the disc 1 is inserted into the disc player through the disc insertion opening 2, and thereby the structure is capable of avoiding surface-contact between the opening lid 3 and the disc 1, and preventing the disc surface from being scratched by contact with the opening lid 3.

The opening lid 3 has such construction that it is pushed back toward a closed position by the spring 12 to close the disc insertion opening 2, when the lid 3 is no longer in contact with the disc 1 due to the disc 1 having been inserted completely into the disc player.

In the case of unloading the disc, the disc insertion opening 2 is opened by lifting the lever 13 to open the opening lid 3, so that the belts 15 unload the disc 1. The opening lid 3 again closes the disc insertion opening 2 due to the tension of the spring 12, when the lever 13 is released from the lifting position upon completion of the unloading of the disc.

The present exemplary embodiment discloses a method of forming the curved surface 16 on the opening lid 3 by providing the opening lid 3 with a length longer than the intervening space between the lid retainers 6, thereby causing the opening lid 3 to become bowed, when the opening lid 3 is mounted on the case 7. However, a curved opening lid 3 can be formed alternatively with other methods, including a method that uses a die in a process of making the opening lid 3 to initially form the lid 3 with the curved surface 16 as well as the curved edge 11.

Figure 2B:
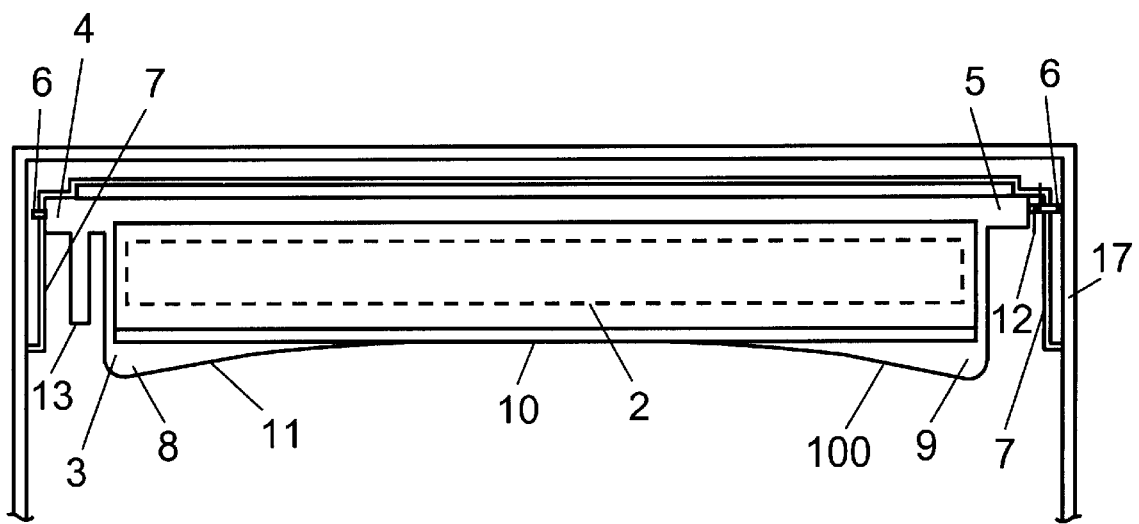
FIG. 2B is similar to FIG. 2A, but shows an example of the disc insertion arrangement in which an opening lid includes a straight edge.

Although the curved edge 11 and the curved surface 16 of the opening lid 3 have been described in this exemplary embodiment as a curved edge and a curved surface that extend continuously, either one or both of the curved edge and the curved surface may include a straight portion. Also, the curved edge can be formed by a combination of one or more angles and two or more generally straight edges, and the curved surface can be a combination of one or more angles and two or more generally planar surfaces. An example of the disc loading apparatus having an opening lid with a straight edge 100 is shown in FIG. 2B.

Also, the shapes of the insertion opening 3 and the opening lid 2 need not be limited to the rectangular shapes discussed above, so long as the shapes are such that the lid 2 will sufficiently cover the opening 3 when in a closed state, the lid 2 is movable between open and closed states, and the lid 2 effects only point or line contact with the disc edge (i.e. avoids surface contact) when the disc is inserted through the opening 3 by contacting and pushing the lid 3 toward its open state.

Accordingly, the disc loading apparatus of the present invention is provided with the disc insertion opening with the opening lid that is pushed and opened by the disc, for preventing dust from entering into the disc player through the opening, wherein the opening lid makes point-contact or linear contact with the disc when the disc is inserted through the disc insertion opening while making contact with the opening lid. Therefore, the invention can provide the disc loading apparatus that does not cause scratching of a surface of the disc, since the opening lid avoids surface-contact with the disc.

What is claimed is:

1. A disc loading apparatus comprising:
   a frame member having a disc insertion opening formed therein;
   an opening lid movably mounted to said frame member for movement between a closed position covering said disc insertion opening and an open position allowing a disc to be inserted through said disc insertion opening along a disc passage path;
   wherein said opening lid has two longitudinal ends, first and second longitudinally extending sides, and first and second faces opposite each other, each of said first and second faces being defined between said first and second longitudinally extending sides, one of said first and second faces facing said disc insertion opening when said opening lid is in said closed position and the other of said first and second faces facing away from said disc insertion opening when said opening lid is in said closed position;

wherein said first longitudinally extending side of said opening lid is sloped from each of said longitudinal ends of said opening lid toward a center portion of said first longitudinally extending side in a direction toward said second longitudinally extending side of said opening lid;

wherein said opening lid is positioned relative to said disc insertion opening such that, with said opening lid in said closed position, upon insertion of the disc into said disc insertion opening along the disc passage path, the disc contacts against said one of said first and second faces of said opening lid at a contact location, pushes said opening lid from said closed position toward said open position and then slides against said first longitudinally extending side of said opening lid such that said opening lid contacts the disc only with point contact or line contact between said first longitudinally extending side of said opening lid and a peripheral edge of the disc.

2. The disc loading apparatus according to claim 1, wherein
said first longitudinally extending side of said opening lid is continuously sloped from each longitudinal end of said opening lid toward the center portion of said first longitudinally extending side in said direction toward said second longitudinally extending side of said opening lid.

3. The disc loading apparatus according to claim 1, wherein
said first longitudinally extending side of said opening lid is continuously curved from each longitudinal end of said opening lid toward the center portion of said first longitudinally extending side in said direction toward said second longitudinally extending side of said opening lid.

4. The disc loading apparatus according to claim 1, wherein
said first longitudinally extending side includes a straight portion.

5. The disc loading apparatus according to claim 1, wherein
said first face of said opening lid is sloped from each of said longitudinal ends of said opening lid toward a center portion of said first face in a second direction toward said second face of said opening lid.

6. The disc loading apparatus according to claim 5, wherein
said first face of said opening lid faces said disc insertion opening when said opening lid is in said closed position.

7. The disc loading apparatus according to claim 5, wherein
said first face includes a flat portion.

8. The disc loading system according to claim 5, wherein
said first longitudinally extending side of said opening lid is continuously sloped from each longitudinal end of said opening lid toward the center portion of said first longitudinally extending side in said direction toward said second longitudinally extending side of said opening lid.

9. The disc loading apparatus according to claim 5, wherein
said first longitudinally extending side of said opening lid is continuously curved from each longitudinal end of said opening lid toward the center portion of said first longitudinally extending side in said direction toward said second longitudinally extending side of said opening lid.

10. The disc loading apparatus according to claim 5, wherein
said first longitudinally extending side includes a straight portion.

11. The disc loading apparatus according to claim 1, wherein
said first face of said opening lid is continuously sloped from each of said longitudinal ends of said opening lid toward a center portion of said first face in a second direction toward said second face of said opening lid.

12. The disc loading apparatus according to claim 11, wherein
said first face of said opening lid faces said disc insertion opening when said opening lid is in said closed position.

13. The disc loading apparatus according to claim 11, wherein
said first longitudinally extending side of said opening lid is continuously sloped from each longitudinal end of said opening lid toward the center portion of said first longitudinally extending side in said direction toward said second longitudinally extending side of said opening lid.

14. The disc loading apparatus according to claim 11, wherein
said first longitudinally extending side of said opening lid is continuously curved from each longitudinal end of said opening lid toward the center portion of said first longitudinally extending side in said direction toward said second longitudinally extending side of said opening lid.

15. The disc loading apparatus according to claim 11, wherein
said first longitudinally extending side includes a straight portion.

16. The disc loading apparatus according to claim 1, wherein
said first face of said opening lid is continuously curved from each of said longitudinal ends of said opening lid toward a center portion of said first face in a second direction toward said second face of said opening lid.

17. The disc loading apparatus according to claim 16, wherein
said first face of said opening lid faces said disc insertion spening when said opening lid is in said closed position.

18. The disc loading apparatus according to claim 16, wherein
said first longitudinally extending side of said opening lid is continuously sloped from each longitudinal end of said opening lid toward the center portion of said first longitudinally extending side in said direction toward said second longitudinally extending side of said opening lid.

19. The disc loading apparatus according to claim 16, wherein
said first longitudinally extending side of said opening lid is continuously curved from each longitudinal end of said opening lid toward the center portion of said first longitudinally extending side in said direction toward said second longitudinally extending side of said opening lid.

20. The disc loading apparatus according to claim 16, wherein
said first longitudinally extending side includes a straight portion.

21. The disc loading apparatus according to claim 1, wherein said opening lid is mounted to said frame member so as to be swingable about an axis between said open and closed positions.

22. The disc loading apparatus according to claim 21, wherein said second longitudinally extending side constitutes an upper side of said opening lid; and said axis is provided adjacent said second longitudinally extending side such that, when said opening lid is swung from said closed position toward said open position, said first longitudinally extending side is swung upwardly.

23. The disc loading apparatus according to claim 1, wherein said opening lid is shaped such that, when a disc is inserted through said disc insertion opening along said disc passage path by causing the disc to contact said opening lid and push said opening lid toward said open position, said opening lid contacts the disc at only a peripheral edge thereof.

24. The disc loading apparatus according to claim 1, wherein said first longitudinally extending side includes sloped portions beginning immediately at said longitudinal ends and sloped toward said second longitudinally extending side.

25. The disc loading apparatus according to claim 1, wherein said second longitudinally extending side is at a hinged side of said opening lid, and said first longitudinally extending side is at a free side of said opening lid, said hinged side having a longitudinally extending axis about which said opening lid is swingable between said open position and said closed position.

* * * * *